J. G. HEASLET.
ARMATURE SHAFT MOUNTING.
APPLICATION FILED OCT. 15, 1915.
1,181,384.
Patented May 2, 1916.
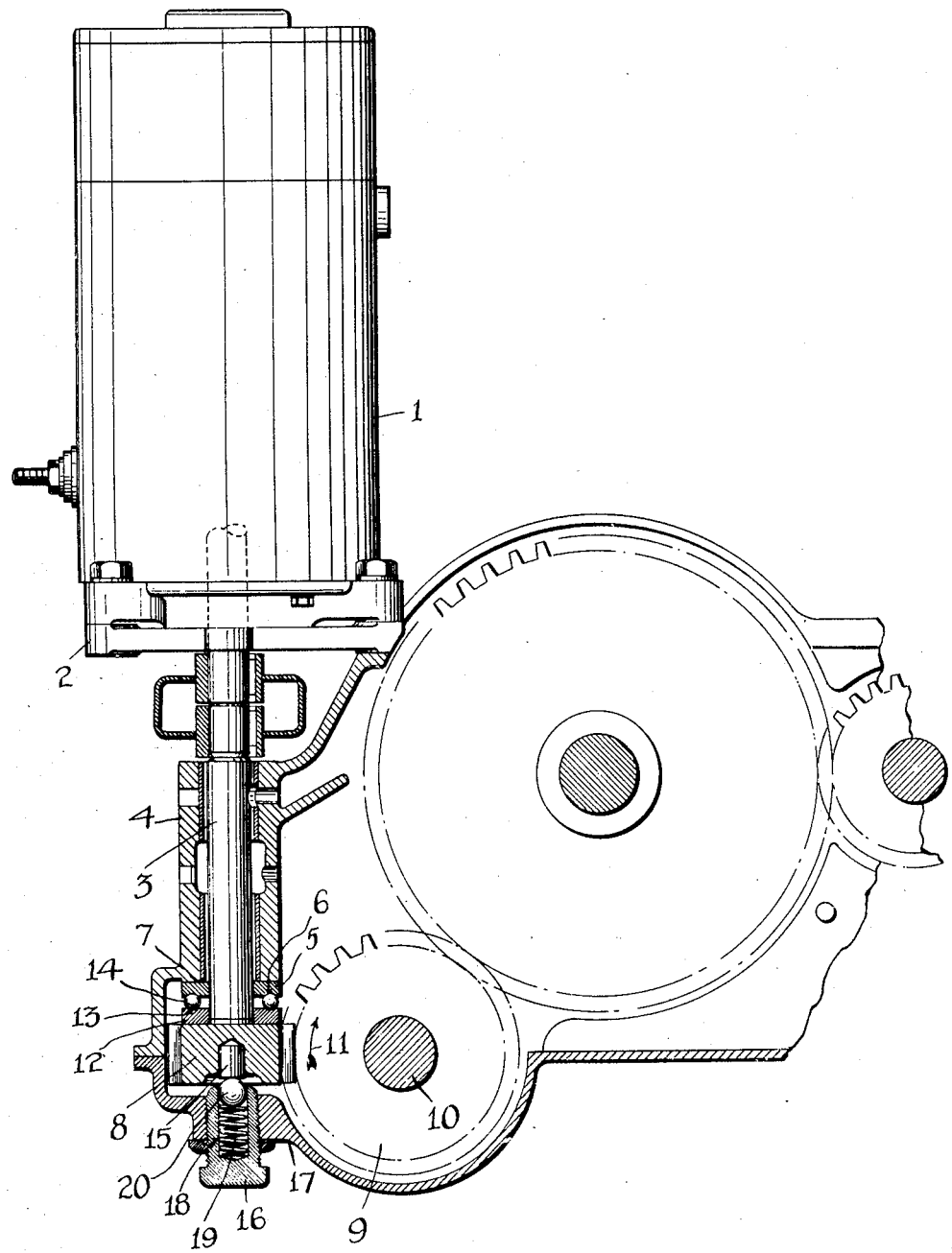
WITNESSES
INVENTOR
James G. Heaslet
BY
Stewart Perry
ATTORNEY

UNITED STATES PATENT OFFICE.

JAMES G. HEASLET, OF DETROIT, MICHIGAN, ASSIGNOR TO THE STUDEBAKER CORPORATION, A CORPORATION OF NEW JERSEY.

ARMATURE-SHAFT MOUNTING.

1,181,384.  Specification of Letters Patent.  Patented May 2, 1916.

Application filed October 15, 1915. Serial No. 55,957.

*To all whom it may concern:*

Be it known that I, JAMES G. HEASLET, a citizen of the United States of America, and resident of Detroit, in the county of Wayne and State of Michigan, have invented certain new and useful Improvements in Armature-Shaft Mountings, of which the following is a specification.

My invention relates to improvements in journal bearings adapted for use in connection with the mounting of armature shafts as the same are employed in electric motor or electric generator practice.

The immediate object I have in view is to overcome a certain pounding or rattling of the shaft in its bearings where said shaft is vertically disposed.

It is well known that armature shafts must be so mounted that they have a longitudinal play, otherwise a dangerous friction is generated. Where, as in the present case, the armature shaft is vertically mounted, it is obvious that the journal bearings must be so organized as not only to take care of the rotary movement of the shaft, but also to support the weight of the shaft and armature and, as previously stated, it is necessary that such bearings should be so constituted as to allow for a certain amount of longitudinal play along the line of the axis of the armature shaft.

I have observed, in the operation of such devices, that the play of the shaft above referred to causes a pounding of the bearing, according as the thrust of the shaft may be upward or downward. This thrust of the shaft in one direction or the other may be due to the exercise of a variety of forces. I have noticed that when the armature is rotated at a considerable speed the shaft is elevated, bringing the bearings in close contact, whereas, when the speed is reduced below a critical point, the shaft seems to react and follow the power of gravity away from its bearings within the play allowed for said longitudinal thrust. Again, in the operation of the worm gear as employed by me to rotate the shaft, all of which will be more fully described hereinafter, the tendency of the thrust of the gears when in operation is to elevate the shaft when run at a high rate of speed, but, when such speed is reduced or discontinued, the shaft is liable to fall back of its own weight against its lower support. Due to these causes, and perhaps others which I have not yet identified, I notice that a pounding or rattling effect is produced between the bearings for the shaft, which are constituted, as stated, to limit the longitudinal movement of the shaft.

It is the purpose of my present invention to provide means by which said pounding or rattling may be minimized or possibly overcome.

I have illustrated my invention in the accompanying drawing, which drawing forms a detail of the drawings illustrating an invention for which I have made application for Letters Patent of the United States, said application it being my intention to file in the Patent Office coincident with this application, the latter application being entitled: "A system for assembling a motor and its associated mechanism."

The drawing illustrates an electric generator vertically mounted in elevation with its armature shaft, bearings and power mechanism being shown in vertical section.

By 1, I have indicated an electric generator mounted on a bracket as 2.

3 is the armature shaft of the generator 1, suitably mounted in a sleeve 4.

5 is a ball bearing mounted at the base of the sleeve 4 and provided with annular groove 6, adapted to receive balls, and having a central aperture 7 to receive the armature shaft 3.

8 is a worm gear secured to the end of the shaft 3, while 9 is a corresponding worm gear mounted on a power shaft as 10, 9 preferably turning in the direction indicated by the arrow 11; in said pending application the shaft 10 is the main shaft of the motor, but, for the purposes of this application, it may be connected with any source of power.

12 is a ball bearing mounted on the top of the gear 8, having an annular groove therein 13.

14 are balls adapted to be interposed between said bearings 5 and 12 and within said annular apertures 6 and 13.

15 is a pin axially mounted in the worm gear 8.

16 is a member externally screw-threaded and adapted to be secured into the bracket 17, which is axially bored, as at 18, and adapted to receive a helical spring 19 carrying ball 20, said spring, ball and pin being mounted in a line projected from the axis of the shaft 3.

The teeth of the worm gears 8 and 9 are so disposed as to produce a slight upward thrust of the shaft when said gears are in operation at a high rate of speed, due, perhaps, to the friction generated between the teeth.

As previously stated, when the generator is in operation at a high rate of speed the tendency is to lift the shaft and hold said bearings in close contact. When, however, the speed is reduced below a critical point, the tendency of the armature shaft is to fall against the lower section of its bearings, due to the force of gravity exercised upon said shaft and armature, which, it will be understood, are of considerable weight. Heretofore it has been the practice to fix these bearings controlling the lateral thrust of the shaft in a permanent position, leaving however between said bearings sufficient space to allow for a certain play sufficient to permit a longitudinal movement of the armature shaft. Where said shaft is horizontally disposed it will be obvious that such arrangement is more or less practical and that the pounding effect to which I have referred will not necessarily occur, but where, as in my present invention, the armature shaft is vertically disposed, the thrust of the shaft in either direction, that is to say, upwardly when the mechanism is run at a high rate of speed, or downwardly when the speed is reduced below a critical point, will result in throwing the shaft against its bearings, upwardly or downwardly as the case may be, and, as these changes are sometimes sudden and frequent, a pounding results, which is manifest by a rattling or hammering noise, all of which is undesirable from the standpoint of convenience and utility. To overcome these difficulties, I interpose an elastic member between a suitable support and the lower of the two bearings, which accomplishes the result of normally retaining said bearings in intimate relation, notwithstanding the fact that the resultant thrust due to the operation of the gears is diminished or because the armature is not sustained within the electric field in the manner heretofore referred to; and yet, on the other hand, such bearing being elastic is capable of yielding under pressure to any longitudinal movement that may be necessary to satisfy the requirement incidental to the longitudinal movement of the shaft in its relation to the generator as heretofore stated. The latter device comprises the member 16, containing the helical spring 19, the ball 20 and the bearing point 15. The member 16 may be screwed into its support 17 in such a way as to regulate the tension of the spring 19. Under normal conditions, I make said tension sufficient to support the weight of the shaft and armature so that the ball bearings 14 are closely held between their bearings 5 and 12, and yet the tension of the spring should not be sufficient to positively resist a certain longitudinal movement of the shaft where, to meet the electrical or magnetic conditions, such movement is desirable.

From what has been said it will be obvious that the bearings adapted to support the armature shaft are, by the means described, constantly held in close contact and yet are capable of a slight variation, and that such variation is immediately compensated for by the spring pressure. Hence, the pounding or rattling above referred to, is minimized, if not entirely overcome.

What I claim is:—

1. An electric generator mounted with its axis substantially vertical and having an armature shaft projected below the armature, a support for said shaft, a bearing embodying coöperating bearing elements, one of which is carried by the shaft and another of which is mounted in a fixed position, said bearing operating to limit the longitudinal movement of said shaft within predetermined limitations, and a spring having its tension directed against said shaft to normally hold the elements of said bearing in contact, a worm gear carried by said shaft and a worm gear carried by a suitable power shaft, said gears being mounted to coöperate and the teeth of said gears being so disposed as to tend to retain said bearings in contact when the said gears are operated.

2. An electric generator mounted with its axis vertical and having an armature shaft projected below the armature, a support for said shaft, a bearing embodying coöperating annular bearing elements, one of which is secured to the shaft and another of which is suitably mounted in a fixed position, balls interposed between the bearing elements, an externally screw-threaded member centrally bored, mounted in a correspondingly screw-threaded casing, a helical spring carried within said bore, a ball carried by said spring, a bearing pin carried at the end of said shaft, said pin, ball and spring being mounted in alinement with the shaft, a worm gear carried by said shaft adapted to coöperate with a corresponding worm gear carried by a power shaft with means to rotate the power shaft.

3. An electric generator mounted with its axis vertical and having a depending armature shaft, a support for the shaft, a bearing adapted to limit the longitudinal movement of the shaft without interfering with its rotary movement, said bearing embodying coöperating bearing elements, one of which is mounted in a stationary position adjacent said shaft, while the other is carried by the shaft, elastic means to cause the bearing element carried by the shaft to bear on the stationary bearing element with a yielding pressure, thus permitting a slight longitudinal movement of the shaft away from the stationary bearing element under abnormal conditions, such elastic pressure being sufficient to hold said bearing elements in intimate contact, in combination with means to rotate said shaft by a worm-gear secured to the shaft, the teeth of said gear being so disposed as, in the rapid operation of the gears, to tend to hold said bearing elements in contact.

4. An electric generator mounted with its axis vertical and having a depending armature shaft, a support for said shaft, an annular bearing element embracing the shaft and permanently mounted adjacent thereto, a second annular bearing element secured to said shaft and adapted to coöperate with said first-mentioned bearing element to limit the longitudinal movement of the shaft without interfering with its capacity for rotary movement, a spring carrying a ball bearing adjustably mounted in a suitable support positioned in alinement with the shaft, and supporting the same from the lower end thereof, such spring tension being adapted to normally hold said bearing elements in contact but adapted to yield to a longitudinal movement of the shaft, in combination with means to rotate said shaft by a worm gear secured to the shaft, the teeth of said gear being so disposed as in the rapid operation of the gears to tend to hold said bearing elements in contact.

5. An electric generator mounted with its axis substantially vertical and having a depending armature shaft, a gear on said shaft, and means for supporting the shaft and gear for rotation, in combination with a thrust bearing arranged between the shaft and its supporting means, one of the elements of which bearing is fixed relative to the supporting means, a ball positioned in alinement with the shaft, a spring for impelling the ball into engagement with the gear, and means for varying the tension of the spring to normally maintain the parts of the thrust bearing in coöperative engagement.

6. An electric generator mounted with its axis substantially vertical and having a depending armature shaft, a gear on said shaft, and means for laterally supporting the shaft and gear for rotation, in combination with a thrust bearing arranged between the shaft and its supporting means, one of the elements of which bearing is fixed relative to the supporting means, and unitary spring-pressed means for supporting the weight of the armature shaft and gear and adapted to normally maintain the parts of the thrust bearing in coöperative engagement.

Signed by me at Detroit, Mich., this 12th day of October 1915.

JAMES G. HEASLET.

Witnesses:
R. E. SCRATCH,
ROY C. GAMBLE.